United States Patent [19]

Stephenson et al.

[11] Patent Number: 4,738,461
[45] Date of Patent: Apr. 19, 1988

[54] IMPLEMENT HITCH ADAPTOR AND TRANSMISSION ASSEMBLY FOR ALLOWING TOWING TRACTOR TO TURN SHARPLY

[75] Inventors: Roger D. Stephenson, Bloomfield; James C. Walters, Ottumwa; Craig A. Richardson, Ottumwa; J. Clark Fickle, Ottumwa, all of Iowa

[73] Assignee: Deere & Company, Moline, Ill.

[21] Appl. No.: 88,501

[22] Filed: Aug. 19, 1987

Related U.S. Application Data

[63] Continuation of Ser. No. 927,467, Nov. 6, 1986.

[51] Int. Cl.$^4$ .............................................. B62D 13/00
[52] U.S. Cl. .................................... 280/400; 180/14.4; 180/53.1; 280/456 A
[58] Field of Search ............... 280/400, 408, 456 R, 280/456 A; 180/53.3, 53.1, 14.4

[56] References Cited

U.S. PATENT DOCUMENTS

| | | | |
|---|---|---|---|
| 3,450,220 | 6/1969 | Frandsen et al. | 180/53.1 X |
| 3,862,769 | 1/1975 | Bechman et al. | 280/400 |
| 3,908,398 | 8/1975 | Braunberger | 180/14.4 X |
| 3,961,677 | 6/1976 | Geisthoff | 180/53.1 X |
| 4,027,913 | 6/1977 | Youngers et al. | 280/456 X |
| 4,184,558 | 1/1980 | De Buhr et al. | 180/14.4 |
| 4,366,877 | 1/1983 | Visser et al. | 180/53.1 |
| 4,640,378 | 2/1987 | Dobberphul | 180/53.1 |

FOREIGN PATENT DOCUMENTS 2256659  7/1975  France ............................ 280/408

Primary Examiner—James T. McCall

[57] ABSTRACT

A towed implement includes apparatus adapted for being driven by a power take-off shaft of a towing tractor. The implement includes a tongue having a hitch bracket at its forward end, the bracket incorporating a ball coupler. A hitch adapter is provided for coupling the hitch bracket to a three-point hitch of the towing tractor, the adapter including a hitch bar connected to the ball coupler by a pin. The implement includes a power transmission assembly separate from the hitch adapter and including identical first and second right angle gear boxes, with the first gear box being rigidly fixed to the tongue and the second gear box being drivingly coupled to the first gear box along an axis passing through the ball coupler and about which the second gear box may rotate. The second gear box has an input shaft coupled for being driven by the tractor power take-off shaft and a steering arm is coupled to the second gear box and has an end received in a guide track fixed to the hitch adapter so as to keep the second gear box input shaft aligned with the tractor power take-off shaft.

17 Claims, 4 Drawing Sheets

IMPLEMENT HITCH ADAPTOR AND TRANSMISSION ASSEMBLY FOR ALLOWING TOWING TRACTOR TO TURN SHARPLY

This application is a continuation of application Ser. No. 927,467, filed Nov. 6, 1986.

BACKGROUND OF THE INVENTION

The present invention relates to agricultural implements and more particularly relates to such implements which include apparatus that is adapted for being powered by the power take-off of a towing tractor.

Tractors are provided with a drawbar for towing implements therebehind. However, because the hitch point of the drawbar is relatively close to the tractor, the tractor cannot be turned sharply because the inside rear tractor tire will then engage the implement tongue.

Also, in the case where the tractor power take-off (PTO) is being used to power apparatus of the implement, the driveline bearings and joints are subjected to severe radial loadings during turns, the loads increasing as the turns tighten. The drivelines must also telescope during turns and this results in damaging levels of thrust being imposed on the drivelines when they telescope under load.

U.S. Pat. Nos. 4,366,877 granted to Vissers et al on Jan. 4, 1983 and 4,525,987 granted to Werner et al on July 2, 1985 both disclose designs which overcome one or more of the above-mentioned problems attendant with implements coupled to tractor drawbars. However, the implements in each of these patents includes a hitch adapter and transmission assembly which are integrally fashioned resulting in rather complicated and, thus, expensive assemblies. Furthermore, there is no way of using the hitch adapter of one implement for towing another.

SUMMARY OF THE INVENTION

According to the present invention there is provided a novel hitch adapter and transmission assembly for use in implements of the type adapted to be towed by a tractor and having appartus adapted to be powered from the tractor PTO.

A broad object of the invention is to provide an implement hitch adapter and transmission assembly which are of relatively simple and inexpensive construction and cooperate to permit a towing tractor to turn sharply. This is accomplished in part by constructing the hitch adapter and transmission assembly so as to be separate one from the other and by constructing the transmission assembly so as to include a pair of identical, right angle gear boxes.

A more specific object is to provide an implement, of the type described hereinabove, having a tongue including a hitch adapter coupled to the forward end of a beam of the tongue by a ball connector permitting universal movement between the adapter and beam, the tongue further including a transmission assembly having a gear box including a horizontal input shaft adapted for connection to a tractor PTO shaft, an output shaft located along a vertical axis passing through the ball conector and a mounting permitting it to swivel about the vertical axis so as to maintain the tractor PTO shaft and gear box input shaft in alignment during turning of the towing tractor.

Yet another object is to construct the transmission assembly of identical first and second right angle gear boxes with the first and second gear boxes including horizontal output and input shafts, respectively, and either including separate vertical input and output shafts, respectively, interconnected by a coupler, or including a single shaft serving as the input of the first gear box and the output of the second gear box.

Another object is to provide first and second gear boxes, as set forth in the previous object, wherein the first gear box is fixed to a tongue beam, the second gear box is mounted for swiveling about a vertical axis passing through the output shaft thereof and a restraining arm assembly secured to the second gear box and operatively associated with a hitch adapter, coupled to the tongue beam for swiveling about the vertical axis, for preventing the second gear box from swiveling about the axis relative to the hitch adapter.

These and other objects will become apparent from a reading of the ensuring description together with the appended drawings.

DESCRIPTION OF THE PREFERRED EMBODIMENT

Figure 1:
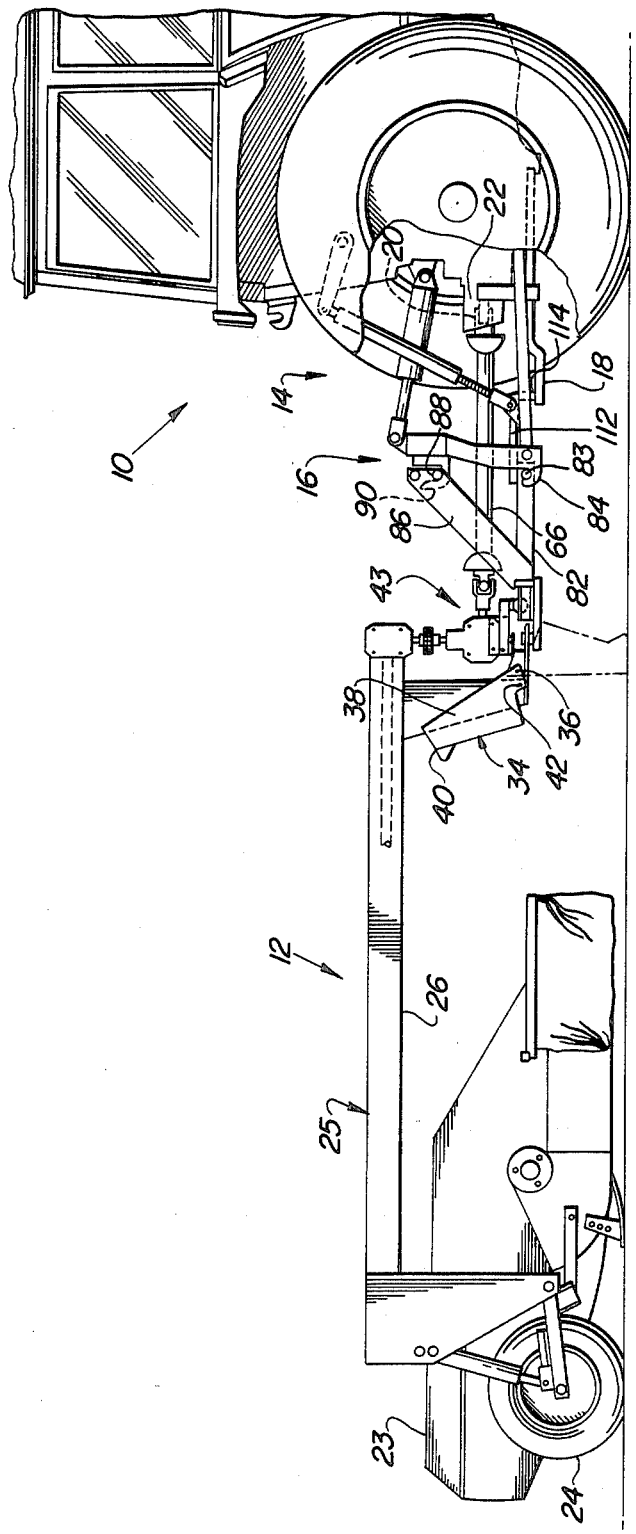
FIG. 1 is a right side elevational view of an implement having a tongue constructed in accordance with the present invention and coupled to the three-point hitch and power take-off shaft of a towing tractor.

Referring now to FIG. 1, there is shown a tractor 10 coupled for towing and supplying power to an agricultural implement 12. Specifically, the tractor 10 includes a three-point hitch 14 having its upper and two lower links pivotally connected to a quick coupler 16. The tractor 10 also includes a rearwardly extending drawbar 18 and a power take-off shaft 20 located within a shield 22.

The implement 12 is here shown in the form of a mower conditioner comprising a body 23 supported on transversely spaced ground wheels 24 (only one shown) and having a tongue 25 projecting forwardly from the left side thereof. The tongue 25 comprises a box beam 26 and an L-shaped hitch bracket 28 joined integrally with and depending from the beam 26 and including upper and lower, horizontally projecting support and hitch plates 30 and 32, respectively (see FIG. 2), having purposes described below. A support stand 34 is vertically pivotally connected, as by a pin 36, to a lower forward location of the bracket 28 for movement between a raised position, as shown in solid lines in FIG. 1, wherein the bracket 28 is partially received between opposite, transversely spaced stand sidewalls 38 (only one sidewall shown) and a lowered position, as shown in dashed line in FIG. 1, wherein a foot 40 joining the sidewalls 38 engages the ground. A latch pin 42 extends through aligned holes in the stand 34 and bracket 28 for selectively maintaining the stand in its raised position.

Figure 2:
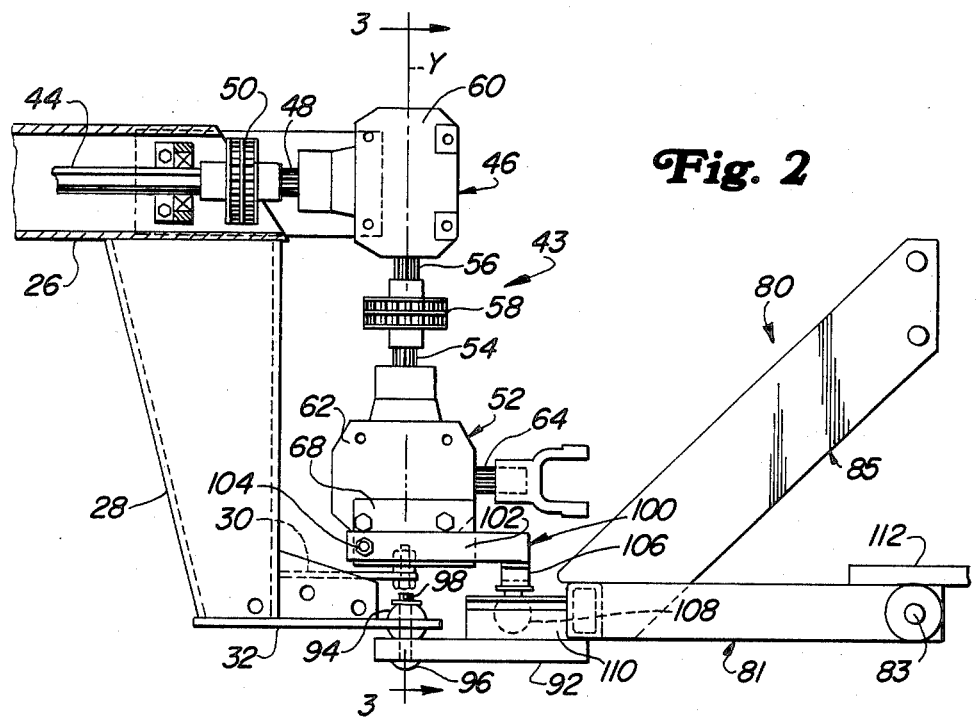
FIG. 2 is an enlarged right side elevational view of the hitch adapter and transmission assembly at the forward end of the implement tongue shown in FIG. 1 with the tongue beam being broken away to expose a portion of the transmission assembly.

As can best be seen in FIG. 2, the implement 12 includes a power transmission assembly 43, for driving apparatus (not shown) of the implement, comprising a power shaft 44 rotatably supported in the beam 26, a first right angle gear box 46 having an output shaft 48 connected to the shaft 44 by a sprocket and chain type shaft coupler 50 and a second right angle gear box 52 having an output shaft 54 connected to an input shaft 56 of the first gear box by a sprocket and chain type shaft coupler 58. Specifically, the first gear box 46 includes a housing 60 rigidly mounted to the forward end of the beam 26 and containing a pair of meshed bevel gears (not shown) respectively mounted on the shafts 48 and 56 in a manner well known in the art (e.g. see FIG. 5). The second gear box 52 includes a housing 62 containing another pair of meshed bevel gears (not shown) respectively mounted on the output shaft 54 and on an input shaft 64 projecting forwardly and connected to the tractor power take-off shaft 20 by a telescopic drive shaft 66 (see FIG. 1). The gear box housing 62 has a lower portion thereof received within and bolted to a channel bracket 68. The horizontal support plate 30 of the hitch bracket 28 extends beneath and parallel to a bottom of the bracket 68. The plate 30 is pivotally received on a bushing 72 which is located in alignment with the gear box shafts 54 and 56 and held in place by a bolt 74 extending through the bushing 72 and bracket 68 and carrying a washer 76 which acts, upon tightening a nut 78 on the bolt, to urge the bushing tightly against the bracket 68. Thus, the shaft coupler 58 and bushing 72 cooperate to support the second gear box 52 for swiveling about a vertical axis Y, during turning of the tractor 10, in a manner more fully described below.

A hitch adapter 80 connects the implement hitch bracket 28 to the quick coupler 16. Specifically, the hitch adapter 80 includes a horizontal, U-shaped member 81 forming transversely spaced, forwardly extending legs 82 (only one shown), each supporting an outwardly projecting hitch pin 83 received in an upturned hook 84 of the quick coupler 16. Joined to and extending upwardly and rearwardly from a central location of the member 81 supporting a cross pin 88 at the forward end thereof, the pin 88 being engaged by a central hook member 90 of the quick coupler. Joined to and extending horizontally and rearwardly from a central location of the U-shaped member 82 is a hitch bar 92. A ball coupler 94 is carried by the horizontal hitch plate 32 of the implement hitch bracket 28 and is centered on the axis Y. A hitch pin 96 extends through the hitch bar 92 and ball coupler 94 and is held in place by a pin 98 received in a hole provided in the pin 96. Thus, it will be appreciated that as the implement transverses uneven ground the implement will be permitted to undergo universal movement about the coupler 94 and, as the tractor turns, articulation will take place about the axis Y. Provided for preventing turning loads and drive torgue reaction loads from being imposed on the telescopic drive shaft 66 is a steering or torque arm 100 comprising a pair of spaced straps 102 having their rear ends coupled to a rear portion of the channel bracket 68 by a horizontal pivot pin 104 and having their forward ends projecting forwardly beyond the bracket 68 and interconnected by a ball support memeber 106 having a downwardly projecting ball 108 fixed thereto. Fixed to the top of the hitch adapter hitch bar is a fore-and-aft extending, upwardly opening guide track 110 which in vertical transverse cross-section is shaped complimentary to the ball 108, with the latter being received in the track. Thus, turning motion of the tractor 10 relative to the implement will occur about the axis Y and be transferred to the second right angle gear box 52 by the arm 100 so as to maintain the input shaft 64 of the gear box 52 in alignment with the tractor power take-off shaft 20. Also any tndency of drive torque reactions to rotate the gear box 52 about the axis Y will be restrained by the arm 100. Also, it can be seen that the ball 108 will roll in the track 110 when the implement rolls about the ball coupler 94 and will shift fore-and-aft in the track when the implement pitches about the coupler. The horizontal alignment of the power take-off shaft 20 and gear box input shaft 64 is maintained during operation by a downstop 112 in the form of a bar fixed to one of the legs of the hitch adapter 80 and having a downwardly projecting forward end 114 engaged with the tractor drawbar 18. Thus, the downstop operates to prevent the three-point hitch 14 from lowering to the extent that there is a significant difference between the heights of the power take-off shaft 20 and input shaft 64 which would result in significant additional drive loads being imposed on the telescopic drive shaft 66. However, the shaft 66 will telescope to accommodate small differences in heights as might result from using different towing tractors.

Figure 3:
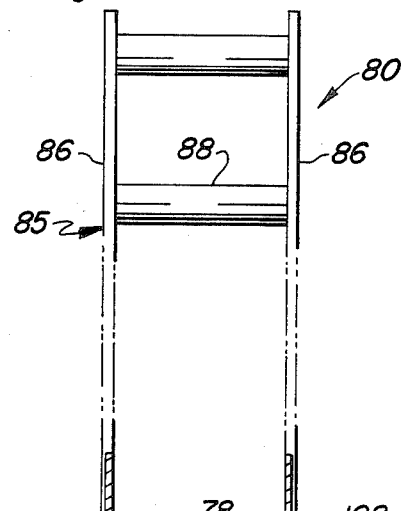
FIG. 3 is an enlarged vertical sectional view taken along line 3—3 of FIG. 2 but with the gear boxes omitted for clarity.
Figure 3:
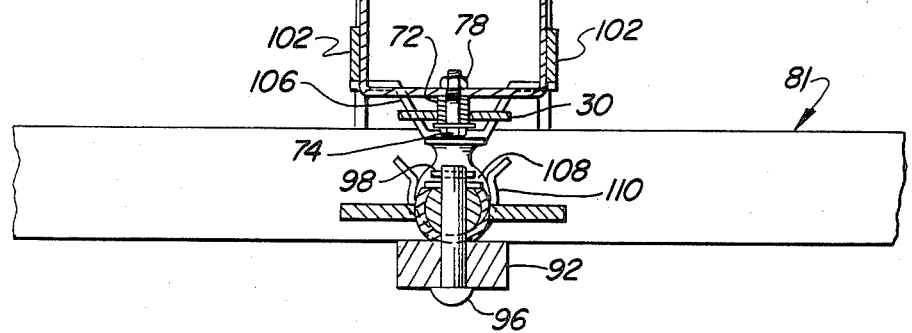

The operation of the embodiment illustrated in FIGS. 1–3 is thought to be understood from the foregoing description and for the sake of brevity is not reiterated here. However, it is to be noted that due to the fact that the hitch adapter 80 is structurally separate from the power transmission assembly, the hitch adapter is not captive to being used with the implement 12 but may easily be unhitched therefrom and used with a different implement. Also, economies are realized by using common identical right angle gear boxes 46 and 52 in the power transmission assembly 43.

Figure 4:
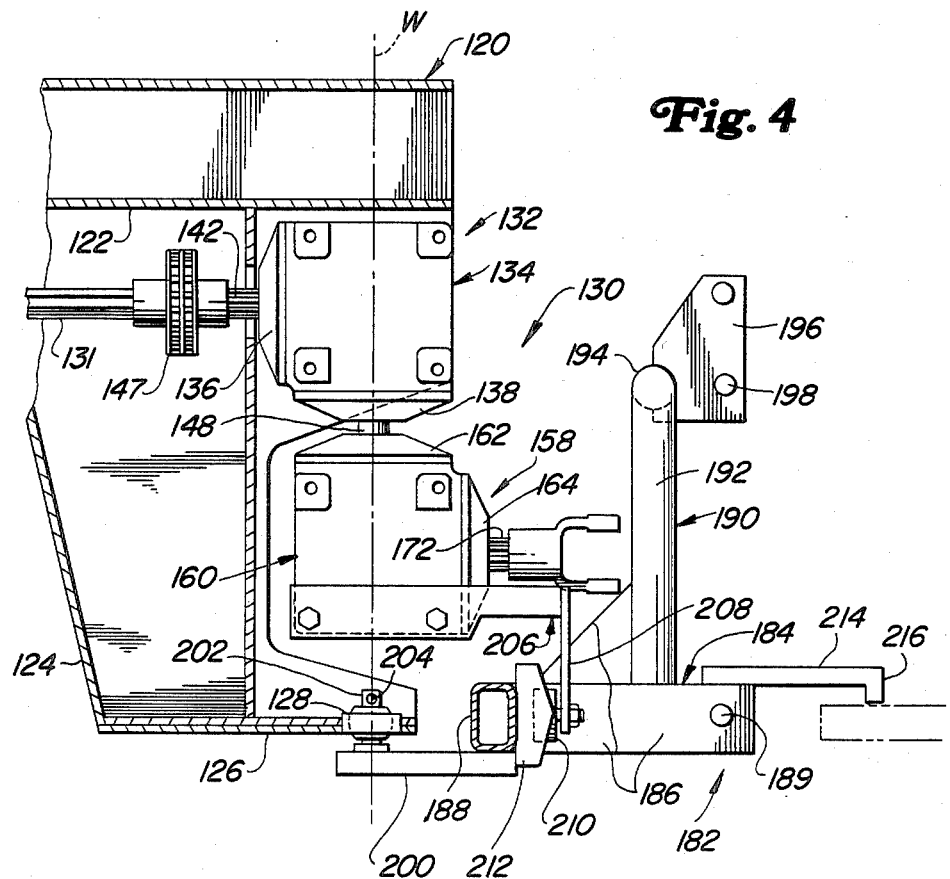
FIG. 4 is a right side elevational view of an alternate embodiment of the hitch adapter and transmission assembly.
Figure 5:
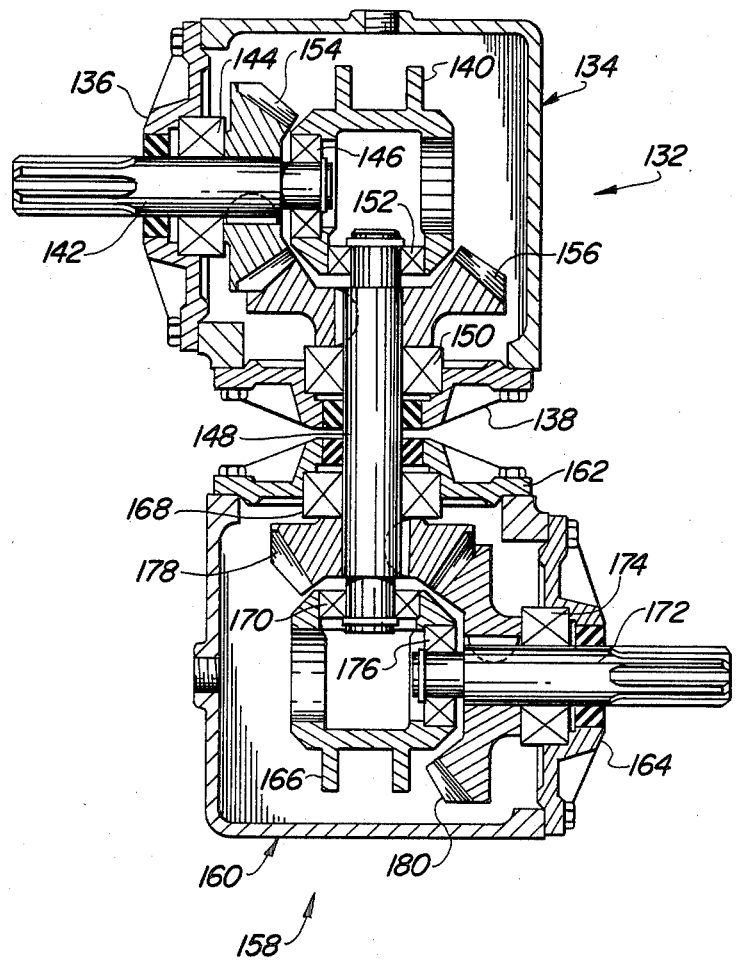
FIG. 5 is a vertical sectional view taken through the right angle gear boxes of the transmission assembly shown in FIG. 4.

Referring now to FIGS. 4 and 5, there is shown a second embodiment of the invention which in principle is quite similar to the embodiment of FIGS. 1–3. Specifically, shown is a forward end portion of an implement tongue 120 including a box beam 122 having an L-shaped hitch bracket 124 fixed to and depending from an undersurface thereof. The bottom of the bracket 124 is defined by a horizontal hitch plate 126 in which is incorporated a ball coupler 128.

A power transmission assembly 130 is provided for driving apparatus (not shown) of the implement and includes a power shaft 131 mounted below and in parallel relationship to the box beam 122 by shaft support hangers (not shown). Mounted to a lower front surface of the beam 122 is a first right angle gear box 132 including a housing 134 defined in part by removable rear and bottom shaft support walls 136 and 138, respectively, and an interior shaft support core 140. An output shaft 142 is rotatably supported in the rear wall 136 and core 140 by bearings 144 and 146, respectively, and is coupled to the power shaft 131 by a sprocket and chain type shaft coupler 147. A shaft 148 is rotatably supported in the bottom wall 138 and core 140 by bearings 150 and 152 respectively. A first set of meshed right angle bevel gears 154 and 156 are respectivley mounted to the shafts 142 and 148. Located beneath the gear box 132 is an identical second gear box 158 including a housing 160 defined in part by removable upper and front shaft support walls 162 and 164, respectively, and an interior shaft support core 166. The shaft 148 serves both as the input to the gear box 132 and as the output shaft of and as the sole support for the gear box 158 and is rotatably supported in the upper wall 162 and core 166 by bearings 168 and 170, respectively. An input shaft 172 is rotatably supported in the front wall 164 and core 166 by bearings 174 and 176, respectively, and is adapted for connection to the power take-off shaft of a towing tractor. A second set of meshed right angle bevel gears 178 and 180 are respectively munted on the shaft 148 and the input shaft 172. It is noted that the shaft 148 is vertical and lies on an axis W which passes through the ball coupler 128.

A hitch adapter 182 is provided for mounting the hitch bracket 124 of the tongue 120 to the three-point hitch of a towing tractor. The adapter 182 includes a horizontal U-shaped frame member 184 having opposite transversely spaced legs 186 joined to and projecting forwardly from a transverse portion 188. Hitch pins 189 (only one shown) project outwardly from end portions of the legs 186. A vertical, U-shaped support mast 190 has opposite transversely spaced legs 192 having lower ends fixed to the legs 186 of the frame member 184 and having upper ends joined by a cross member 194 carrying a bracket 196 supporting a cross pin 198. the two hitch pins 189 and cross pin 198 either cooperate for connection to three points of a quick coupler, like that described above, or may serve for direct coupling to the lower and upper links of the tractor three-point hitch. Fixed to a central bottom surface of the transverse portion 188 of the U-shaped frame member 184 is a horizontal hitch bar 200 carrying a vertical pin 202 received in the ball coupler 128 and held in place by a hey or clip (not shown) inserted in a hole 204 provided in the pin. Thus, it will be appreciated that during turning of a towing tractor the hitch adapter 182 will pivot relative to the implement about the axis W. For the purpose of causing the gear box 158 to move about the axis W so as to maintain the input shaft 172 aligned with the tractor power take-off shaft a steering or torque arm 206 is fixed to the bottom of and projects forwardly from the housing. The arm 206 has a downwardly projecting forward end 208 having a roller 210 mounted thereto for rotation about a horizontal axis and received for restrained up and down movement within a vertical guide track 212 fixed to a central vertical inner face of the transverse adapter portion 188. A downstop 214, like the previously described downstop 112, is fixed to and projects forwardly beyond one of the adapter legs 186 and has a downturned end 216 adapted for engaging a towing tractor drawbar for positioning the hitch adapter 182 for holding the implement tongue at a desired level for disposing the input shaft 172 of the gear box 158 at substantially the same height as the power take-off shaft of a towing tractor.

Thus, it will be appreciated that one of the main differences between the embodiment illustrated in FIGS. 4 and 5 and that illustrated in FIGS. 1-3 is that the gear boxes 132 and 158 share the shaft 148 which serves also as the sole support for the lower gear box 158. Another main difference is that the arm 206 is fixed rather than pivoted to the lower gear box, carries a roller 210 rather than a ball with the roller 210 being received in a vertical guide track 212 rather than a horizontal track. Despite these differences, it will be appreciated that the gear box 158 is mounted for pivoting about a vertical axis and that the arm 206 operates to transfer to the hitch adapter torque reaction forces tending to rotate the gear box about the axis W and operates in response the pivotal movement of the hitch adapter 182 about the axis W, to pivot the gear box 158 about the axis W.

We claim:

1. In an agricultural implement requiring power to be delivered thereto by a towing tractor and including a tongue formed by an elongated beam, a hitch adapter connected to a forward end of the beam and providing connection points for attachment of a tractor three-point hitch, and a power transmission assembly mounted to the forward end of the beam and including a first part fixed to the beam and a second part rotatable relative to the fixed part about a vertical axis and including a horizontal input shaft adapted for connection to a tractor power take-off shaft, the improvement comprising: said hitch adapter being separate from said transmission assembly; and a ball joint connection means located along said axis and establishing a connection between the beam and hitch adapter.

2. The agricultural implement defined in claim 1 wherein said first and second parts of the transmission assembly are first and second right angle gear boxes respectivley having output and input shafts located along said axis; coupler means joining the latter mentioned output and input shafts together; and connection means coupling the first right angle gear box to the beam for pivoting about said axis.

3. The agricultural implement defined in claim 1 and including steering arm means operatively coupled between the second right angle gear box and the hitch adapter for causing said second right angle gear box to pivot about said axis in response to relative pivotal movement between the hitch adapter and beam about said axis.

4. The agricultural implement defined in claim 3 wherein said steering arm means includes an arm which parallels the input shaft of the second gear box and has its rear end vertically pivotally connected to the second gear box; a forward end of the arm being defined by a downward projection terminating in a spherical ball; and a fore-and-aft guide track forming part of said hitch adapter and receiving said ball.

5. The agricultural implement defined in claim 2 wherein said first and second right angle gear boxes are identical.

6. The agricultural implement defined in claim 1 wherein said first and second parts of the transmission are first and second right angle gear boxes, respectively; and a single shaft located along said axis and forming the output shaft of the second right angle gear box and the input shaft of the first right angle gear box; shaft support means for supporting said single shaft in the first and second right angle gear boxes against shifting along said axis whereby said single shaft acts to support the first right angle gear box from the second right angle gear box.

7. The agricultural implement defined in claim 6 and further including a rotation restraint arm secured to said second angle gear box in general parallelism to the input shaft and having a forward end projecting forwardly from the second right angle gear case and being defined by a downward projection terminating in a bearing member; a guide member slidably receiving said bearing member and having laterally spaced surfaces preventing relative pivotal movement between the hitch adapter and the second right angle gear box.

8. The agricultural implement defined in claim 7 wherein said hitch adapter includes a centrally located forwardly porjecting downstop adapted for engaging a tractor drawbar for limiting downward movement of the tractor three-point hitch to which the hitch adapter to adapted for connection.

9. The agricultural implement define in claim 1 wherein said first and second parts of the transmission assembly are first and second right angel gear boxes; shaft means located along said axis and serving as the ouput of the second right angle gear box and as the input of the first right angle gear box.

10. The agricultural implement defined in claim 9 wherein said shaft means includes an output shaft forming part of said second right angle gear box, an input shaft forming part of said first right angle gear box and coupler means joining the top and bottom respectively of the output and last-named input shafts for rotating in unison.

11. The agricultural implement defined in claim 10 wherein the first and second right angle gear boxes are identical.

12. The agricultural implement defined in claim 9 wherein said shaft means comprises a single shaft forming the sole interconnection between the first and second right angle gear boxes.

13. In an agricultural implement requiring power to be delivered thereto by a towing tractor and including a wheel-supported frame, a tongue coupled to and extending forwardly from the frame, a transmission having a housing mounted to a forward portion of the tongue for rotation about an upright axis, and an input shaft journalled in the housing and being adapted for connection to a tractor p.t.o. shaft, the inprovement comprising: coupling means joined to the tongue exclusive of the housing and defining uninversal pivot means located along said upright axis, said coupling means including means adapted for attchment to a towing tractor and for rotating about said axis relative to said tongue whenever the tractor turns; and steering means coupled between the transmission housing and the coupling means for causing said housing to rotate about said axis in concert with said coupling means.

14. The agricultural implement defined in claim 13 wherein said coupling means is a three-point hitch adapter.

15. The agricultrual implement defined in claim 13 wherein said steering means includes an arm having a-rear end vertically pivotally mounted to the housing; a fore-and-aft arranged guide forming part of said coupling means; and said arm having a forward end received in said guide.

16. The agricultural implement defined in claim 15 wherein said coupling means is a three-point hitch adapter.

17. The agricultural implement defined in claim 16 wherein said guide is in the form of a channel having arcuate sidewalls and said forward end of the guide arm being defined by a ball received in the channel.

* * * * *

UNITED STATES PATENT AND TRADEMARK OFFICE
CERTIFICATE OF CORRECTION

PATENT NO.  :  4,738,461
DATED       :  19 April 1988
INVENTOR(S) :  Roger Dale Stephenson et al It is certified that error appears in the above-identified patent and that said Letters Patent is hereby corrected as shown below:

Claim 8, line 3, change "porjecting" to -- projecting --; and line 6, change "to" to -- is --.

Claim 9, line 1, change "define" to -- defined --; and line 3, change "angel" to -- angle --.

Claim 13, line 8, change "inprovement" to -- improvement --; line 10, change "uninversal" to -- universal --; and line 12, change "attchment" to -- attachment --.

Claim 15, line 1, change "agricultrual" to -- agricultural --.

Signed and Sealed this

Twenty-third Day of May, 1989

*Attest:*

DONALD J. QUIGG

*Attesting Officer*     *Commissioner of Patents and Trademarks*